United States Patent Office.

JOHN A. JONES, OF BALTIMORE, MARYLAND, ASSIGNOR TO HIMSELF AND E. A. F. MEARS, OF SAME PLACE.

Letters Patent No. 73,531, dated January 21, 1868.

IMPROVED ROOFING-COMPOUND.

The Schedule referred to in these Letters Patent and making part of the same.

TO ALL WHOM IT MAY CONCERN:

Be it known that I, JOHN A. JONES, of Baltimore, in the county of Baltimore, and in the State of Maryland, have invented certain new and useful Improvements in Compound for Roofing; and do hereby declare that the following is a full, clear, and exact description thereof.

The nature of my invention consists in the use of coal-tar, borax, soapstone, and ashes, mixed in the proportions hereinafter given, for the purpose of making a roofing-compound.

I use raw coal-tar, which is first washed in clean water and then passed through a sieve. I take ten gallons of this washed coal-tar and add to it one-quarter of a pound of borax, and after mixing it thoroughly, I add one bushel and a half of soapstone and one-half bushel of ashes, either of wood or coal. When these ingredients have been well compounded the material is ready to be spread upon the felt which covers the roof.

Having thus fully described my invention, what I claim as new, and desire to secure by Letters Patent, is—

The within-named ingredients used together, substantially in the proportions and for the purpose set forth.

In testimony that I claim the foregoing, I have hereunto set my hand, this 15th day of August, 1867.

J. A. JONES.

Witnesses:
   PHILIP T. TILYARD,
   W. H. HAYWARD.